July 6, 1937.  E. CARDONE  2,085,898
APPARATUS FOR AND A PROCESS OF TREATING IMMUNIZED SERA
Filed Nov. 14, 1934
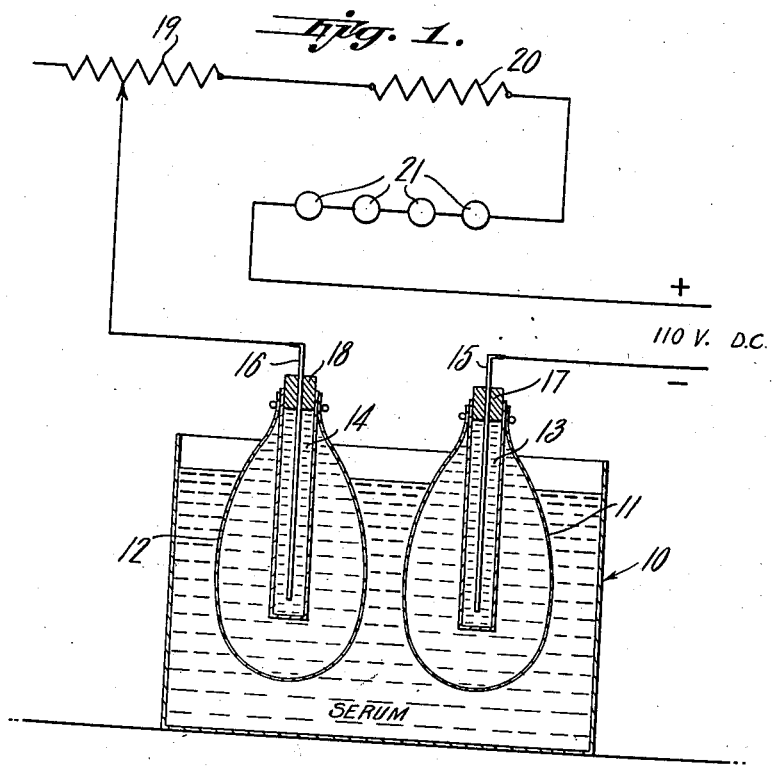
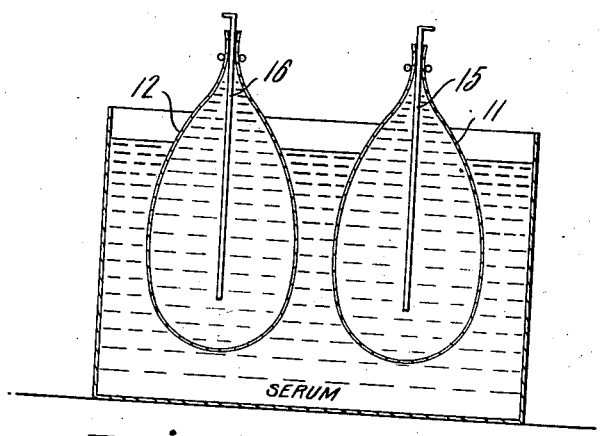
INVENTOR.
EUGENE CARDONE
BY Joseph F. Padlon
ATTORNEY.

Patented July 6, 1937

2,085,898

UNITED STATES PATENT OFFICE 2,085,898

APPARATUS FOR AND A PROCESS OF TREATING IMMUNIZED SERA

Eugene Cardone, Brooklyn, N. Y.

Application November 14, 1934, Serial No. 752,994

5 Claims. (Cl. 204—1)

My invention relates to apparatus for and a process of treating immunized sera. More particularly, it relates to apparatus for and a process of refining and concentrating sera containing antitoxin or antibacterial material and reducing the inert protein content therein to render the sera stable and more powerful.

In the methods now used for treating sera, considerable difficulty has been experienced in removing the major portion of inert proteins in order to obtain suitable concentrated form of serum. If a large quantity of such proteins were removed by presently known methods the cost of the treated serum would be excessive. At the same time, there is a high loss of anti-toxic or antibacterial content. A serum treated by known methods and/or apparatus, eventually may become cloudy due to precipitation of inert bodies. Old serum cannot be easily reconcentrated by present methods. If such sera were reconcentrated, there would be considerable losses in antitoxin or antibacterial body content because all the inert proteins have been previously removed.

It is one of the objects of my invention to provide easily operable apparatus for transforming some or all of the proteins in a serum.

It is one other object of the invention herein, to provide an economic process whereby a comparatively clear serum of comparatively low percentage of nitrogen per unit of antitoxin or antibacterial bodies, is obtained.

It is another object of the invention to provide a process for transforming the water soluble proteins in an immunized serum to water insoluble proteins and eliminating suitable quantities of such proteins from the serum without appreciable losses of antitoxin or antibacterial bodies.

One further and more specific object of this invention is to subject sera containing antitoxin or antibacterial bodies to the action of various pH concentrations to remove at will any undesirable proteins or fractions therefrom, at different pH concentrations without adversely affecting the antitoxin or antibacterial body content and to render such sera stable and clear.

One other object of the invention is to concentrate immunized sera, whether previously concentrated or not, without the use of precipitating salts, but by action of electrical pH variants or by the addition of an alkaline substance.

Another object of the invention is to provide an immunized serum having a low protein content per unit of antitoxin or antibacterial body thereby minimizing anaphylactic shock on subjects.

With the above and other objects and features in view, the invention generally includes subjecting immunized serum or body extracts, whether previously concentrated or not, to a transforming action by means of novel apparatus herein disclosed, in which the pH value of the serum is varied and water soluble proteins are converted to water insoluble proteins and precipitated; removing said undesirable insoluble proteins or any fractions thereof, then treating the serum with alkali to change the pH value of the same and precipitating the proteins from the serum, which contain the antitoxin or antibacterial bodies. The process further includes treating of the precipitate formed with acid substances down to a desired pH value to dissolve said precipitate and then adding solid salt and raising the pH value of the resultant solution with alkaline substances to stabilize the same preparatory to subsequent treatment for sterilization and standardization.

In the drawing:

Fig. 1 is a diagrammatic view of the novel apparatus used in the process described herein; and Fig. 2 is a modification of a part of the apparatus shown in Fig. 1.

In the drawing similar reference characters designate like parts throughout.

An immunized serum containing antitoxins and which is to be treated may have been previously concentrated, for example, by using ammonium sulphate or some other salts. In such case, I dialyze the serum to remove crystalloids therefrom, and add sufficient distilled water to dilute thereby reducing the protein per cubic centimeter of serum. In cases where the serum is obtained for treatment directly from live stock, particularly horses, such previous concentration is not necessary.

In the following steps, the serum is now treated with acid, preferably acetic acid until the pH range of the mixture is lowered to a range of 5.1–5.4. This causes precipitation of some of the inert undesirable proteins. I now dilute one to one with distilled water to reduce the protein content per cubic centimeter. Without filtering off the inert proteins thrown down from the serum, I transfer the whole serum to a container 10, or the like as shown in Fig. 1 of the drawing.

At this point, it is desirable to describe the novel apparatus comprising part of the invention and shown in the drawing before the next step of the process. A pair of containers 11 and 12, consisting of porous or semi-permeable membranous material, each filled with water, are mounted on to metal tubes 13 and 14 respectively by any suitable members, as shown in the drawing. Said metal tubes are filled with water and accommodate platinum electrodes 15 and 16 respectively, and may be supported in any well known manner. Each electrode extends outwardly through stoppers 17 and 18, respectively, and is insulated at said upper extended portion. The stoppers may be provided with a plurality of openings to permit escape of gases generated in the tubes during their use.

One of the electrodes is in connection with wiring of a source of electric current, while the other electrode is in connection with a variable resistance coil 19. The latter is in connection with a fixed resistance 20. A series of carbon lamps 21 are in connection with the coils in order to help regulate the electric current to any desired amperage.

During the passage of the current from one electrode to the other, gases are generated in containers 11 and 12 and in tubes 13 and 14. The gases generated in said containers pass thru the pores thereof or thru a slit previously made at the top of the containers prior to their mounting on the tubes as shown in the drawing.

After having placed the serum into container 10 and the bags filled with water set up on the tubes 13 and 14, as shown in the drawing, the current is turned on to any desired amperage regulated by the variable resistance coil 19.

The electric current passing through the electrodes, water and serum in the manner according to the above described apparatus, transforms all the water soluble proteins originally present in the serum, into water insoluble proteins up to a certain point. I have found that by passing current through the serum in the manner above described, the pH value of the serum rises and precipitation of the water soluble proteins sets in. I stop this transformation when the serum reaches a pH value of about 5.9–6.1, which is about the most desirable ionic concentration range at which to stop. It is to be noted that this transformation does not adversely affect the antitoxin material. The serum at this point has a definite precipitate formed as a result of the transformation. Once the transformation is complete, as shown by the above pH range, in order to remove a large percentage of water insoluble proteins or transformed globulins, the precipitate is separated by centrifuging or filtering. The filtrate contains the antitoxin material with the transformed proteins, while the residue contains the water insoluble proteins—and some of the adhering antitoxin material. The precipitate is washed with distilled water in order to take up the adhering antitoxin material. The washings are added to the original filtrate while the washed precipitate is discarded.

The total filtrates above, are then treated with alkaline solution until a pH value of about 6.7–7.0 is obtained. This bringing up of the pH value causes the precipitation of proteins which remained in solution after the transformation step above, and also of antitoxin material.

By my process, it is also possible to add alkali at any intermediate pH value after pH 5.9 up to 7.0 in order to take down any desired fractions of proteins, instead of only transforming by the electrical means above described.

The precipitated proteins and antitoxin material are filtered off from the alkaline mixture and expressed to remove any traces of the filtrate which is discarded. The expressed precipitate is dissolved with acetic acid until pH values between 5.4–5.2 are obtained. To the resultant solution is added sufficient solid sodium chloride until there is a concentration of this salt of about 1%. The pH value of the solution is brought up to about 6.8 by adding alkaline solution in order to stabilize and preserve the same.

The final product is clear and ready for further treatment, namely, sterilization and standardization.

In the treatment of antibacterial sera the steps are the same as those in the case of serum containing antitoxin material, except that after dialysis, upon the addition with acetic acid, the pH value is brought to a range between 4.2–5.1, instead of 5.1–5.4, as in sera with antitoxin material.

The serum is then treated electrically the same as with respect to the serum containing antitoxin material, until a suitable pH value of 5.9 is reached to effect transformation. There is a precipitate of some of the transformed proteins. I then filter to separate the precipitate. Then I acidify the precipitate with any acid such as acetic acid to dissolve the antibacterial material, while the inert proteins remain in the form of a precipitate. The dissolved antibacterial material is filtered off and added to the original filtrate obtained as a result of the transformation up to pH 5.9–6.1. The precipitate furthermore may be washed with distilled water to recover any traces of adhering antibacterial bodies. These washings are added to the first or original filtrate obtained at the pH range 5.9–6.1.

Then I may treat this filtrate in the same manner as I do with respect to the steps of treating the serum filtrate containing antitoxin material after the transformation of the water soluble proteins into water insoluble proteins.

By the modification shown in Fig. 2, I am able to cause a fall in pH value from 7.0 to pH 2.0–3.0 to precipitate some inert proteins.

From the foregoing description taken in connection with the accompanying drawing, it will be noted that I have devised apparatus and a process embodying my invention for refining antiserum, thereby reducing the total inert solids content therein. Also, by my invention I obtain a serum which has a low protein content per unit of antitoxin or antibacterial body content. I can also control the amount of precipitation of proteins by regulating the electroionic concentration of the serum.

Where other methods fail to effect reconcentration without substantial losses, by my method I can economically increase the total potency over 25% without any appreciable loss in antitoxin or antibacterial body content.

While I have described a preferred form of my invention, it is to be understood that various modifications as to steps, parts, choice of materials and their arrangement may be made without departing from the spirit and scope of the invention as defined in the appended claims.

I claim:

1. Apparatus for transforming water soluble proteins into water insoluble proteins in antisera, comprising a plurality of metal tubes containing an electrical conducting liquid medium, porous containers for said tubes for containing water, an electrode insertible into each of said metal tubes, a container with serum for said porous containers and variable electrical control means in connection with said terminals for permitting the passage of electrical current through the antisera.

2. Apparatus for transforming water soluble proteins into water insoluble proteins in antisera, comprising a pair of metal tubes filled with water, an electrode extending into each of said tubes and concentric therewith, means carrying each electrode and insertible into each tube, a porous container filled with water for each of said tubes and mounted thereon, a container filled with serum accommodating said porous containers, and an electric circuit of variable resistance in connection with the terminals for regulating the amperage passing through the terminals.

3. In apparatus for variably transforming water soluble proteins into water insoluble proteins in antisera, the combination with a pair of electric conducting terminals each extending into a metal tube filled with water, of a porous water filled container on each of said tubes, a container filled with serum accommodating the porous containers, and a variably controlled electric circuit.

4. In apparatus for treating immunized sera, the combination with a container having serum, of a pair of platinum electrodes, a metal tube containing water for retaining each of said electrodes, a porous water filled container accommodating each of said metal tubes, a variable resistance coil in connection with one of said electrodes, a fixed resistance coil in connection with said variable resistance, a plurality of resistance lamps in series connected with the fixed resistance coil, and electric circuit means in connection with the other platinum electrode.

5. Apparatus for treating immunized sera, comprising a container for serum, a plurality of semi-permeable container members filled with water and immersed in said serum, a metal tube containing water therein, for each of said container members and extending thereinto, an electrical conductor for each of the tubes, and electrical circuit means in connection with the conductors to permit the passage of electricity therethru for precipitating the proteins in the serum of said first container.

EUGENE CARDONE.